April 7, 1970  J. McCURLEY  3,504,696
VALVE ROTATOR
Filed April 21, 1967
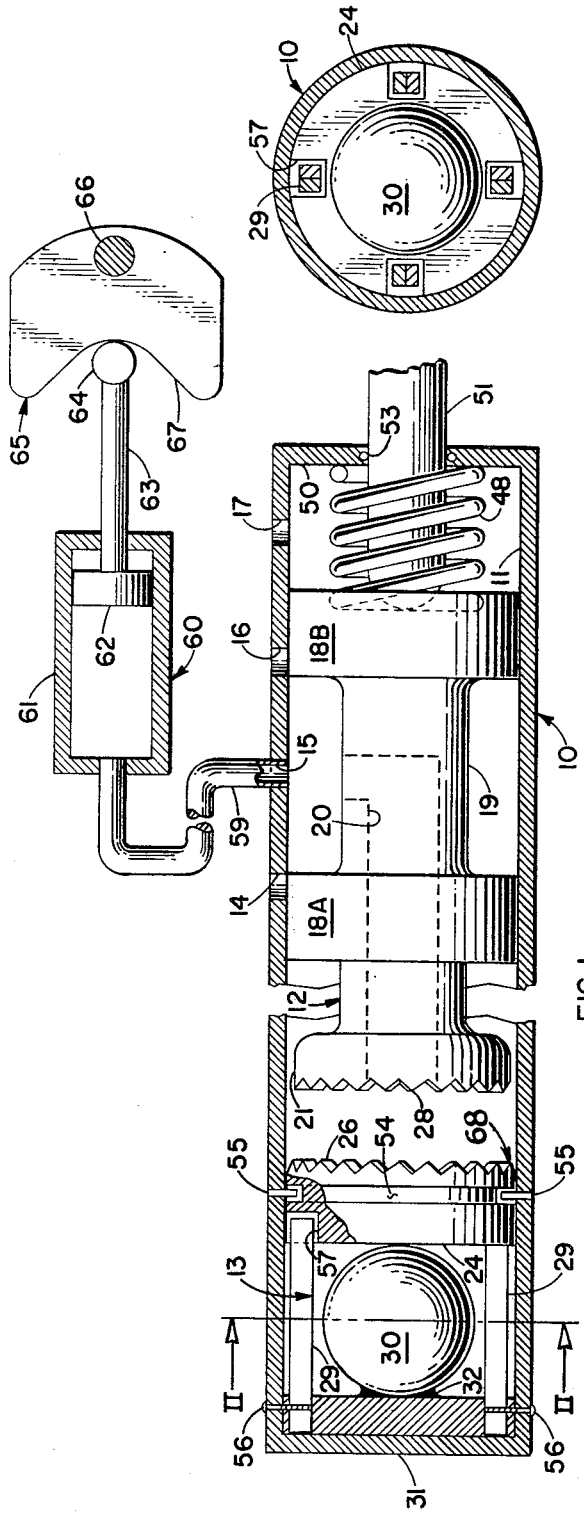
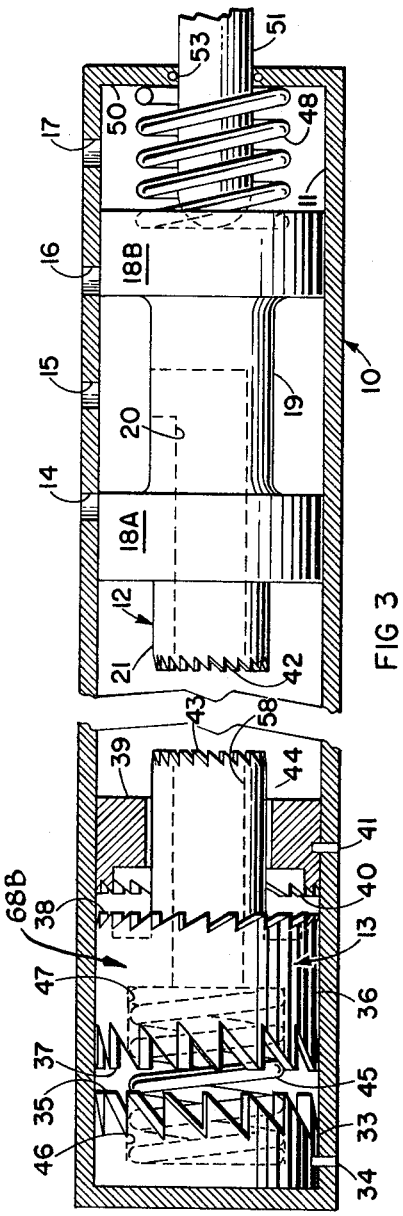
JACK McCURLEY
INVENTOR
BY *H.C. Goldwire*
AGENT United States Patent Office 3,504,696
Patented Apr. 7, 1970

3,504,696
VALVE ROTATOR
Jack McCurley, Dallas, Tex., assignor to LTV Electro-Systems, Inc., Greenville, Tex., a corporation of Delaware
Filed Apr. 21, 1967, Ser. No. 632,817
Int. Cl. B64c 13/00; F16k 29/00
U.S. Cl. 137—331               12 Claims

ABSTRACT OF THE DISCLOSURE

A mechanism for rotating and thus preventing uneven wear of a reciprocating valve element. A large portion of the mechanism is disconnected from the valve element while the latter is in its normal operating range; rotation occurs, in one modification, when a resilient means moves the valve element to a non-operative position. In another modification, thermally deformable elements respond to temperature changes to rotate the valve element while it is in its non-operative position.

---

This invention relates to valves with reciprocating valve members, and more particularly to means for rotation of a reciprocating valve member for minimizing localized wear thereof.

The rotation of reciprocating valve members for improved performance through prevention of uneven wear of valve surfaces under extensive valve operation is well-known in the art, and a variety of devices have been used to effect such rotation. The rotation of a reciprocating valve member, such as the spool in a spool-type valve, minimizes localized wear along the longitudinal axis of the valve spool which is the result of particular areas of the spool being subjected to repeated movement relative to and while in contact with port rims or surface irregularities in the valve sleeve. A similar cause of wear along the longitudinal axis of the valve spool is caused, in some applications, by errosion of the land surfaces adjacent the ports by the impingement thereon of foreign particles in the fluid. Such foreign particles are of particular harm to valves having very precisely formed land and sleeve surfaces. Previous valve rotators, however, have had serious disadvantages. Often the apparatus for effecting valve rotation is of such complex and cumbersome design that it adds considerably to the cost and upkeep of the valve. Generally, the rotation apparatus, because of its size and other factors, cannot be installed in the valve housings; thus, a separate housing is required which in turn necessitates a connecting shaft between the spool and the rotating mechanism, additional bearings supporting the shaft, and seals to protect the bearings and prevent oil leakage from the housing. The very bulk and weight of such a mechanism is a disadvantage in that the inertia of the system tends to oppose the normal reciprocal movement of the valve, an effect which may be very undesirable when frequent and/or rapid adjusting movement is required. In addition, existing valve rotators add an undesirably great degree of friction to valve operation. Since they are connected to the valve members, their own friction with associated parts adds significantly to, and must be overcome by, a force seeking to reposition the valve for varying fluid flow controlled thereby. Such friction is particularly harmful in valves which require frequent and rapid spool movement. Another problem presented by existing designs is that they commonly function by the use of geared mechanisms which rotate the valve in a limited number of increments; thus, although particular portions of the spool do not continuously wear against particular portions of the sleeve, the same portions of the spool will wear against particular portions of the sleeve at each increment of each complete cycle of rotation. This wear tends to produce a plurality of worn areas or grooves on the spool surface along the longitudinal axis of the spool.

It is, accordingly, a major object of the present invention to provide a new and improved valve rotator.

A further object of the present invention is to provide a valve spool rotator which does not restrict spool movement during normal operation of the valve.

A closely related object is to provide a valve spool rotator in which the rotating means adds substantially no frictional or inertial resistance to normal operating movement of the spool.

Another object is to provide a valve spool rotator of simple and inexpensive design.

Still another object is to provide a valve spool rotator which eliminates the need for a separate housing for the rotating means, with resulting benefits such as the elimination of connecting shafts between spool and rotator housings, elimination of shaft bearings and seals, and prevention of problems of oil leakage from such seals.

An additional object is to provide a valve spool rotator which provides an infinite number of increments of rotation of the spool.

Other objects and advantages will be evident from the specification and claims and from the accompanying drawing illustrative of the invention.

In the drawing:

FIGURE 1 is a longitudinal, sectional view of a valve employing an embodiment of the invention and showing an actuator associated with the valve;

FIGURE 2 is a cross-sectional view of the valve, taken as at line II—II of FIGURE 1; and FIGURE 3 is a longitudinal, sectional view of a valve utilizing a modification of the invention.

With reference to FIG. 1, there is shown a spool-type valve having a housing 10 with an inner cylindrical surface 11 within which is rotatably mounted a spool 12. A spool rotating means 13 is also mounted in the housing 10. Ports 14, 15, 16, 17 open through the cylindrical surface 11 into the housing 10, and the ports 14, 16 function in conjunction with lands 18A, 18B and a spool groove 19 therebetween to control fluid flow. The spool rotating means 13 comprises first and second, independent and distinct structures, the first structure comprising a set of teeth 28 (to be described) formed on the spool and the second structure 68 comprising the remainder of the rotating means, e.g., spherical member 30, thermally deformable element 29, rotatable member 24, and serrations 26, all to be more fully described below. The spool 12 is slidable within a predetermined range of movement (more fully described later) in which the spool lands provide operating control of fluid flow through the ports 14, 16 and is further slidable to a non-operative position, outside the normal range of movement, in which it is adjacent and engaged with the second structure 68 of the rotating means 13. Although the valve spool rotating means 13 is not limited, in its application, to use with a particular valve, it is shown, for illustrative purposes, in a typical pressure-control valve having four ports. Port 14 is a supply pressure port which is connected to an outside source of fluid under pressure. Port 15 is a control pressure or output port which, through tubing 59, is connected to a component, such as a hydraulic actuator 60, receiving fluid flow therefrom. The actuator 60 comprises, in the example, a barrel 61 and a piston 62, the latter being connected through a rod 63 to a cam rider 64 engaging a cam 65 rigidly mounted on and extending perpendicularly of a shift 66 which (for example) in turn is connected to, and rotated by movement of, a pilot's control stick (not shown) in a manner known in the art of artificial feel systems for airplanes. In the particular construction shown, the cam surfaces 67 is shaped to allow maximum extension of the rod 63 when the pilot's control stick, hence the cam 65, is in a neutral position and to progressively restrict such extension as the stick is moved, in either direction, from its neutral position. With the stick held motionless in a given position, therefore, there is no motion of the piston 62, and no fluid can flow from port 15 and into the actuator 60 through the tube 59. Port 16 is a hydraulic system return port, and port 17 is a supplemental return port. The lands 18A, 18B are mutually spaced relative to the spacing between the supply pressure port 14 and the return pressure port 16 so that when the spool 12 is so positioned in the housing 10 relative to ports 14, 16 that land 18A closes port 14 and land 18B closes port 16, the lands 18A, 18B will extend only a very slight distance past ports 14 and 16, respectively, toward port 15. The spool 12 thus is shown in a neutral position wherein the ports 14 and 16 are completely closed by lands 18A and 18B, respectively. In this neutral position, the spool 12 is centered within the predetermined range of movement of the spool relative to the housing 10 for normal operating control of fluid flow through the ports 14, 16. The "predetermined range of movement" includes the neutral position of the valve spool and extends to each side of the neutral position by an interval within which at least one of the ports 14, 16, is closed by a land 18A or 18B; the magnitude of this interval necessarily varies with both the specific valve configuration and its application. In the non-operative position, the spool 12 is located adjacent the second structure 68 of the rotating means 13 and outside the above-mentioned, predetermined range of movement. Ordinarily port 16 will still be closed in this latter position; but whether both ports 14, 16 are open is a mere function of land width and is not critical.

A two-ended channel 20 formed in the interior of the spool 12 opens at one of its ends into the annular space within the groove 19 between the spool lands 18 and, at its other end, has communication with the confronting face of a rotating means member 24 (to be described). The end of the housing 10 most immediately adjacent the spool end 21 is closed, as at 31. The channel 20, in combination with fluid supplied under pressure through the port 14, cooperates with the housing 10 and the end face area of the spool 12 at its end 21 to form a means for supplying a force to the spool for maintaining the spool within the above-mentioned predetermined, normal range during normal operating control by the spool of fluid flow through the ports 14, 16, which means is operative for moving the spool from the non-operative position into the predetermined, normal range of movement, as will be more fully explained. When in the predetermined, normal range, the spool end 21 is spaced from the member 24 by at least one half of the predetermined, normal range.

The second structures 68 of the rotating means 13 comprises the member 24, which is rotatably mounted in the housing 10 in juxtaposition with the spool 12 and has a face confronting the spool 12 and provided with serrations or teeth 26. The spool 12 has an end 21 confronting the member 24 and having a face provided with serrations or teeth 28 engageable with the teeth of the member 24, the spool teeth 28 comprising the first structure of the rotating means 13. An annular keyway 54 is formed on the circumference of the member 24 and is slidably engaged with at least one key 55, or equivalent which is rigidly mounted on the housing 10. The key 55 and keyway 54 operate to prevent all but a limited amount of longitudinal movement of the member 24 relative to the housing 10, but allow free rotational movement of the member.

The second structure 68 further comprises at least one, thermally deformable element 29 connected between the member 24 and the housing 10. This element 29 is rigidly affixed at one of its ends to the housing end 31 by fastening means such as a pin 56 and is loosely engaged, at its other end, with at least one, essentially rectangularly cross-sectioned cavity 57 formed in the member 24, the at least one cavity being formed adjacent the circumference of the member 24 and the at least one, thermally deformable element 29 being affixed to the housing end 31 preferably at a point adjacent the housing inner cylindrical surface 11. Referring also to FIG. 2, a preferred embodiment utilizes four thermally deformable elements 29, each of which elements 29 is a bi-metallic strip loosely engaged with an associated cavity 57 formed in member 24. The bi-metallic strips 29 are positioned so that the planes in which the two metals of the strips are joined are approximately perpendicular to the adjacent cylindrical surface 11 and so that the strips extend generally longitudinally of the housing 10.

Means 30 (FIG. 1) for restraining the member 24 from sliding away from the spool 12 while still allowing rotation of the member relative to the housing 10 is provided. The means 30 is preferably a ball bearing mounted between the member 24 and the housing end 31, the ball 30 preferably being rigidly and centrally affixed to the housing by any suitable means, such as welding or brazing 32.

A means for moving the spool 12 from the predetermined normal range of movement to the non-operative position upon cessation of application of the force for maintaining the spool within its normal range comprises resilient means such as a coiled spring 48 having one end footed on the end of the spool 12 opposite its end 21 and another end footed against the adjacent endwall 50 of the housing 10, the resilient means being rotatably slidable relative to the spool and/or the housing. The spring 48 is of strength and length sufficient to enable it, by expanding, to force the spool teeth 28 into engagement with the member teeth 26 when the means for maintaining the spool in its normal range is not operating.

A shaft 51 extends and is slidable through an opening in the housing endwall 50 and is operable for imposing on the spool 12 a control force urging movement of the spool, within the housing 10, toward the member 24. The shaft 51 is sealed by any suitable means 53 between the shaft and the housing endwall 50. It is possible to omit the endwall 50 entirely, whereupon the seal 53 and port 17 are no longer necessary. The shaft 51 transmits the above-mentioned force to the spool 12 from an outside source (not shown) during normal operation of the valve.

FIG. 3 shows a modification of the invention in which the second structure 68A of the rotating means 13 comprises a body 33 rigidly mounted in the housing 10 by means such as a pin 34 and having ratchet teeth 35 disposed in an annular array and extending from the body toward the spool 12. The construction of the housing 10, cylindrical surface 11, spool lands 18A, 18B, channel 20, shaft 51, compressed spring 48, supply pressure port 14, output port 15, return port 16, and supplemental return port 17 is substantially the same as in the embodiment described in connection with FIGS. 1 and 2; accordingly, the channel 20, in cooperation with fluid supplied under pressure through the port 14, again cooperates with the housing 10 and the end-face area of the spool 12 at its end 21 to form a means for supplying a force to the spool for maintaining the spool within the predetermined normal range of movement during normal operation of the valve. Port 15 is again connected to a component such as the hydraulic actuator 60 of FIG. 1. As previously mentioned, when the control stick is held motionless in a given position, there is no motion of the piston 62, and no fluid can flow from the port 15. The spool 12 and the member 36 (to be described) are mutually spaced, when the spool 12 is in the predetermined normal range, by a distance of at least half the operating range. A member 36 which is slidably mounted in the housing 10 between the body 33 and the spool 12 has a first set of ratchet teeth 37 extending therefrom toward the body 33 in an annular array and substantially matching, but sloped oppositely from, the teeth 35 of the body, and a second set of ratchet teeth 38 extending from the member toward the spool in an annular array and sloped oppositely from the first set of teeth 37.

An annular body 39 (also comprising a portion of the second structure 68) having teeth 40 matching and confronting the second set of teeth 38 on the member 36 is rigidly mounted in the housing 10, between the member and the spool 12, by means such as a key 41. The member 36 is shown, for clarity, in a position spaced slightly from the annular body 39 and the spool 12; in actual use, the member would be adjacent the annular body 39 when not in contact with the spool 12, as will be described. A set of teeth 42 (comprising the first structure) is formed on the spool end 21 confronting the member 36, and a third set of teeth 43 formed on a shank 44 on the member 36, confronts and is engageable with the teeth on the spool. In the preferred embodiment, the teeth 42 on the spool 12 and the third set of teeth 43 on the member 36 are of smaller pitch than the ratchet teeth 35 of the body. The spool 12 and member 36 constitute slidable bodies, at least one of the bodies having a shank 44 which bears one of the two matching sets of teeth on the slideable bodies (i.e., the teeth 42 on the spool 12 and the third set of teeth 43 on the member 36), and which has extension within the annular body 39. The solid shank 44 preferably is formed on the member 36, has extension within the annular body 39, and bears the third set of teeth 43 of the member 36 so that they are engageable with the teeth 42 formed on the spool 12. The shank provides a means for connecting the member 36 and the spool 12 when the spool is moved outside the normal, predetermined range toward the non-operative position. It will be understood that other constructions of the connecting means are possible; for example, one in which the shank 44 is formed on the spool 12 so that the shank extends within the annular body 39 and bears spool teeth 42 engageable with the third set of teeth 43 on the member, the teeth 43 being located directly on the member 36 and not spaced therefrom by a shank. In the preferred embodiment shown in FIG. 3, the first set of teeth 37 on the member is positioned relative to the second set of teeth 38 so that when the second set of teeth is fully engaged with the annular body teeth 40, the first set of teeth 37 is staggered from the ratchet teeth 35 on the body 33. The first set of ratchet teeth 37 on the member 36 is preferably of a different pitch from the second set of teeth 38.

As in the embodiment shown in FIGS. 1 and 2, the channel 20 which is formed in the interior of the spool 12 opens at one end into the annular space within the groove 19 between the spool lands 18A, 18B; at its other end, it opens through the end 21 of the spool confronting the second structure 68 of the rotating means 13. In addition, a channel 58 pierces the member 36 throughout its length and communicates, at its two ends, with the portions of the housing 10 respectively enclosing the spool end 21 and the body 33.

A biasing means, such as a coiled spring 45, resiliently biases the member 36 toward a position in which the second set of teeth 38 is engaged with the teeth 40 of the annular body 39. The biasing means 45 is rotatably slidable relative to the body 33 and/or the member 36 and is preferably mounted in a cylindrical cavity 46 within the body teeth 35 and a cylindrical cavity 47 within the first set of teeth 37 on the member 36. Where desired, it is readily possible to reduce further the friction between the body 33 and resilient means 45 by inserting any suitable anti-friction bearing means between them. Similar friction reduction is also possible, if needed, at the spring 48 of FIGS. 1 and 3.

As in the embodiment shown in FIGS. 1 and 2, a means for moving the spool 12 (FIG. 3) from its normal range of movement to its nonoperative position upon cessation of application of the force for maintaining the spool within the normal range is provided; in the preferred embodiment, this means is the coiled spring 48 mounted in a cavity 49 in an end of the spool 12, footed against the end 50 of the housing 10, and rotatably slidable relative to the spool and/or the housing.

A means for moving the spool 12 within its normal range, as needed for providing desired control of flow through ports 14, 16, is provided in form of a shaft 51 extending through an opening of the endwall 50 of the housing 10 and operable for adding a force additional to, and in combination with, the force applied by the resilient means 48. The shaft 51 is slidable relative to the opening in the housing endwall 50 and is sealed, relative thereto, by any suitable means 53.

The means 48 for moving the spool 12 is of greater strength than the biasing means 45 and is operative for overpowering the biasing means and moving the spool to its inoperative position upon cessation of application of the previously mentioned force for maintaining the spool within the predetermined range of movement during normal operation of the valve.

Referring to FIG. 1, the spool 12 is shown in its neutral position within the normal range of movement previously described, is spaced from the second structure 68 of the rotating means 13, and its lands 18A, 18B are in a neutral position in which they are adjacent and completely close the ports 14, 16, respectively. The actuator 60, connected to port 15 by means of tubing 59, acts to restrict flow of fluid from the housing 10 through port 15. The use of such actuators in artificial feel systems for aircraft is well known in the art. A function of the particular pressure control valve shown is to respond to a varying outside force applied by the shaft 51 and convert the force into fluid pressure proportional to the force. In operation, an outside, varying force directed toward the rotating means 13 is transmitted to the valve spool 12 through the shaft 51 and combined with a force from the compressed spring 48; and the combined forces, if sufficiently large, cause the spool to be displaced slightly in the direction of the member 24 of the rotating means 13 and thus cause the land 18A to move in a direction resulting in opening of supply pressure port 14. As the port 14 is opened, fluid under pressure is allowed to enter the annular sprace within the groove 19 between the lands 18A, 18B in the housing 10 through port 14 and results, in turn, in an increase in fluid pressure in the space between the lands, a movement of fluid through channel 20 and out of the opening of channel 20 in the spool end 21, an increase in fluid pressure in the portion of the housing 10 adjacent its end 31, and a corresponding increase in force against the adjacent end-face area of the spool 12 in a direction opposite to that of the initial force exerted by the shaft 51 and the spring 48. As fluid pressure within the housing 10 increases, the force against the end-face area of spool 12 increases until it is greater than the force supplied by the shaft 51 and the spring 48, at which time the net force on the spool 12 is directioned away from the member 24 and causes the spool to move in that direction. The spool 12 continues to move, in the same manner, to its neutral position wherein land 18A closes the supply pressure port 14, thus stopping the incoming flow of fluid and further motion of the spool. The pressure within the annular space within the groove 19 between lands 18A, 18B thus varies in proportion to the force from the shaft 51, since an increased pressure is produced to maintain the spool 12 within its predetermined range and return it to its neutral position when an increased force is applied by shaft 51. In the specific example, the pressure is transmitted by the fluid through output port 15 and tube 59 to the actuator 60 to apply a corresponding torque on the shaft 66 which is sensed, by the pilot, as a "feel" force applied to his control stick. When the force supplied by the shaft 51 is reduced, the force of fluid pressure against the end face of the spool 12 at its end 21 urging the spool 12 in a direction away from the member 24, as described above, is greater than the oppositely directioned force on the spool from the shaft 51 and spring 48; the net force on the spool is then in a direction away from the member 24, and thus moves the spool further in that direction until port 16 is not closed by land 18B. Fluid then flows out of port 16 and causes fluid pressure within the housing 10 to decrease, which in turn decreases the force of fluid pressure urging the spool 12 away from the member 24 until the net force on the spool is again in the direction of the member 24, whereupon the spool moves in that direction until port 16 is again closed by land 18B and fluid flow and spool motion are halted. Supplemental return port 17 allows drainage of any fluid which may seep from the annular space within groove 19 between lands 18A, 18B past the land 18B and also serves as a vent port which allows fluid to leave or enter the housing 10 upon movement of the spool 12. Thus, in the predetermined range of movement of the valve, the spool 12 must repeatedly move adjacent the ports 14, 16 in response to the varying forces from the shaft 51, which movement causes the lands 18A, 18B to wear along the longitudinal axis of the spool 12 where the lands move past the port edges and any irregularities in the cylindrical surface 11 of the housing 10. Without the present invention, the spool 12 tends to stay in the same rotational position relative to the housing 10 because no force tending to rotate it is applied; particular surface areas of the lands 18A, 18B tend always to move against particular surface areas of the cylindrical surface 11; and the port edges and any irregularities in the cylindrical surface 11 will tend to wear against the lands 18A, 18B along the spool longitudinal axis and to cause worn areas such as grooves and the like to be formed in the lands and/or the cylindrical surface 11. In addition, the same regions of the spool 12 tend to be subjected to the erosive effects of foreign particles in the hydraulic fluid.

Upon the fluid pressure supplied at the port 14 being cut off upon cessation of operation of the source supplying hydraulic pressure thereto, leakage of fluid past the lands 18A, 18B within the housing 10 or, usually more importantly, past the lands and out of the housing through the ports 14, 16, acts to reduce the fluid pressure at the spool end 21, and the spool 12 is moved toward the ball 30 by force provided by the resilient means 48. This motion, shared by the land 18A, opens the port 14, thus providing ready exit of hydraulic fluid from the housing through that port and sharply reducing fluid pressure at the spool end through which the channel 20 opens. As a consequence, the resilient means 48 quickly moves the spool 12 from its predetermined range of movement for normal operating control of fluid flow through the ports 14, 16 and into its non-operative position. This movement ceases when the spool serrations 28 engage the serrations 26 on the member 24, which member then blocks further translation of the spool 12. If the spool serrations 28 are rotatably staggered from the member serrations 26, the spool 12 rotates slightly as the serrations 26 and 28 are brought into complete engagement. Bearing 30 absorbs the force from spring 48 and shaft 51 and prevents the member 24 from moving toward the end 31 of the housing 10 while still allowing freedom of rotation of member 24 and spool 12 relative to the housing 10. The spring 48, slidably mounted relative to the housing end surface 50 and/or the spool 12, also allows rotation of the spool relative to the housing 10. Since key 55 is loosely engaged with the keyway 54, it allows free rotational movement of the member 24 and prevents movement of the member longitudinally with respect to the housing 10 at times when the member and spool 12 are not in mutual contact. The member 24 is thus restrained by the key 55 and bearing 30 in one, approximate longitudinal position in the housing 10.

The at least one thermally deformable element 29, as previously mentioned, is rigidly mounted at one of its ends on the housing 10 by pin 56 and is loosely engaged at its other end with cavity 57 in the member 24. When the ambient temperature at the housing 10 changes, such as when the fluid supply pressure is shut off and the valve cools from a relatively warmer temperature induced by flow of relatively hot hydraulic fluid therethrough during normal operation of the valve, the at least one thermally deformable element 29 tends to bend in a direction perpendicular to the plane within the thermally deformable bimetallic strip in which the dual metals are joined, or parallel to the cylindrical surface 11. As the thermally deformable element 29 bends, its end which is rigidly affixed to the housing 10 by means such as pin 56 is restrained from moving, and its other end moves in a direction parallel to the cylindrical surface 11 and thus causes the circumferential portion of the member 24, in which the element 29 is loosely fitted within the cavity 57, to move in the same direction. The element 29, therefore, rotates the member 24. Since the valve spool 12 is coupled to the member 24 by means of the mutually engaged serrations 26, 28 on the member and the spool 12, respectively, the spool rotates with the member.

When hydraulic pressure is again supplied, by the hydraulic pressure source, at the port 14, hydraulic fluid flows through port 14 and channel 20 into the end of the housing 10 occupied by the spool end 21. As the hydraulically exerted force on an end-face area of the spool 12 thus produced increases, the spool is trereby moved to compress the resilient means 48. When the spool 12 is moved sufficiently far in this direction, it again enters its predetermined range of movement for normal operating control of fluid flow through the ports 14, 16. As this movement continues, the land 18A comes into a position in which it closes the port 14, and hydraulic flow into the housing and further movement of the spool are thereby stopped. The spool 12 remains approximately in its new, rotated position relative to the housing 10, and particular areas of the spool are not subsequently moved against the same irregularities on the cylindrical surface 11 or edges of the ports 14, 16 with which they were aligned previous to the rotation of the spool; thus, the excessive valve wear caused by such repeated movement is greatly reduced. While the spool 12 is disengaged from the second structure 68 of the rotating means 13 and the valve is in operation, the temperature of the fluid of the hydraulic system with which the valve is connected normally increases and thereby raises the temperature of the housing 10 and the fluid therein. Temperature increase causes the thermally deformable element 29 to return approximately to its original, undeformed configuration; this movement rotates the member 24 to about its original position, in which it is capable of again rotating the spool 12 upon the fluid pressure source being made inoperative and the valve allowed to cool. It is to be understood that the rotating means 13 is not limited to rotating the spool 12 only when the valve is cooling; for the bi-metallic elements 29 effect rotation of the valve spool 12 in the reverse direction upon the temperature of the bi-metallic element increasing while the valve spool 12 remains in its inoperaitve position. While the operation of the rotating means 13 has been described with reference to only one thermally deformable element 29, the preferred embodiment utilizes four thermally deformable elements 29, as shown in FIGS. 1 and 2. All these elements 29 operate in essentially the same manner as described above; a plurality of elements 29 is utilized to provide increased rotational force. Since the elements 29 deform in varying degrees with varying temperatures, the spool 12 is rotated in varying degrees, thus providing an infinite number of increments of rotation. This further reduces wear by preventing the same portions of the spool 12 from wearing against particular portions of the cylindrical surface 11 at successive increments of rotation.

Referring now to FIG. 3, the operation of the valve spool 12, while it is in its normal range of operating movement and energized by fluid under pressure supplied through port 14, is similar to that described for the embodiment of FIGS. 1 and 2. While not shown in FIG. 3, an actuator similar to that described with reference to FIG. 1 is connected to port 15 and serves to oppose fluid flow from the housing through port 15 and resulting loss of pressure. When the spool 12 moves to the non-operative position following the cessation of application of fluid pressure through port 14, the spool teeth 42 engage the third set of teeth 43 on the member 36 and, since the compressed spring 48 acting upon the spool is of greater strength than the compressed spring 45 which acts in an opposite direction upon the member 36, the spring 48, aided by any force which may be exerted on the spool by the shaft 51, overpowers the spring 45 and moves both the spool and the member toward the body 35 until the first set of ratchet teeth 37 on the member contacts the body ratchet teeth 35. As the ratchet teeth 35 and 37 are moved into full engagement, the inclined surfaces on ratchet teeth 35 act against those on ratchet teeth 37 to rotate the member 36; body 33 is restrained from rotating by the key 34 rigidly affixing it to the housing 10. Upon the valve being again supplied, through port 14, with fluid under pressure, the spool 12 returns to the predetermined, normal range of movement in its new, rotated position relative to the housing through a sequence of events to be described. From the port 14 and spool groove 19, a flow of fluid and rising fluid pressure is transmitted to the interior of the portion of the housing 10 containing the spool end 21 through the spool channel 20 and thus increases the hydraulically exerted force on the corresponding end-face area of the spool 12. When the sum of this force and the co-directional force exerted on the spool 12 (through the member 36) by the compressed spring 45 begin to exceed the oppositely directed force supplied by the spring 48, the spool moves in a direction away from member 36 and compresses the spring 48 to maintain these opposed sets of forces in balance.

As the second member ratchet teeth 38 engage the fixed, annular body teeth 40, the member 36 is caused to rotate slightly, in the same manner as its rotation upon the complete engagement of the sets of teeth 35 and 37. Since the ratchet teeth 38 and 40 are sloped oppositely from teeth 35, 37, and since the member 36 moves in an opposite direction from its previous movement, the member 36 rotates in the same direction as when the teeth 35, 37 become engaged. As previously described, the teeth 40 are disposed, with relation to teeth 35, so that teeth 37 are slightly staggered from teeth 35 when teeth 38, 40 are fully engaged. Upon the next movement of the spool 12 and member 36 toward the body 33 and from the predetermined range, upon cessation of the supplying of hydraulic pressure to port 14, teeth 37 are thus slightly staggered from teeth 35; and the member and spool are rotated, upon full engagement of teeth 35, 37, by only slightly less than the full pitch of those teeth.

Thus, the annular body ratchet teeth 40 cooperate with teeth 38 to provide a more effective rotational movement of the spool 12 and to prevent the tips of ratchet teeth 37 from striking squarely on the teeth 35 in consequence of both sets of teeth being aligned directly opposite each other. The rotator 13 operates in a manner similar to that already described when, as mentioned previously, the shaft 44 is formed on the spool 12 rather than the member 36 and extends within the annular body 39 to allow the spool teeth 42 to engage teeth 43, the teeth 43 being formed on the face of the member 36 rather than on the shank 44.

To continue with the return of the spool from its non-operative position to its predetermined, normal range of movement, the force exerted by the spring 45 on the member 36 ceases to urge translation of the spool 12 upon the teeth 38, 40 becoming fully engaged; for the annular body 39 is immovable in the housing 10. Further flow of fluid, through the port 14 and spool channel 20, into the portion of the housing containing the spool end 21 further increases the longitudinally directed, hydraulic force on the spool 12, with the consequence that the spool further moves to compress the spring 48, thus terminating the connection of the spool with the member 36 at teeth 42, 43. This motion continues until the land 18A arrives at a position in which it closes off the pressure port 14 and stops further inflow of hydraulic fluid into the housing 10, thus halting further motion of the spool toward the spring 48. At this instant, the spool is in its neutral position; at a location which lies between this neutral position and its position in which there is full engagement of teeth 38 with teeth 40 and teeth 42 with teeth 43, the spool 12 again enters its predetermined, normal range of movement.

In the embodiments of the invention, the valve spool 12 is completely detached from the second structure 68 of the rotating means 13 during the normal operation of the valve. Thus, the rotating means 13 adds neither frictional nor significant inertial resistance to the normal operating movement of the spool 12. The housing 10 supports and encloses both the spool 12 and the rotating means 13 and thus eliminates the necessity for a separate housing for the rotating means and provides a sealed housing for the entire mechanism. This allows simple and effective lubrication of all moving parts within the housing 10 and is of significant further advantage in that the problems involved in transmitting rotational torque to the spool by means of a connecting shaft which itself requires additional bearings and oil seals are avoided.

It should be noted that, while the rotating means 13 provides the advantages described above, its design is not of increased complexity, as compared with previous designs. In fact, it is simpler and more compact than previous designs; and this, coupled with the advantage that relatively large tolerances can be employed as to most of its dimensions, enables inexpensive manufacture of the device.

While only one embodiment of the invention, together with several modifications thereof, have been described in detail herein and shown in the accompanying drawing, it will be evident that various further modifications are possible in the arrangement and construction of its components without departing from the scope of the invention.

I claim:

1. In a spool-type valve of the kind having a housing with an inner, cylindrical surface, ports opening through said surface into said housing, and a spool rotatably mounted in the housing and slideable therein within a predetermined normal range of movement in which the spool controls fluid flow through said ports and to a non-operative position outside said normal range and in which fluid flow through said ports is free of control by the spool the improvement comprising, in combination with said housing and spool:

means for rotating the spool upon the spool moving from the normal range of movement to the non-operative psition;

means for supplying a force to the spool for maintaining the spool within the normal range during normal operating control by the spool of fluid flow through the ports; and means for moving the spool from the normal range of movement to the non-operative position upon cessation of application of said force to the spool.

2. The combination recited in claim 1, the means for rotating the spool including first and second independent and distinct structures, the first structure being immovably located with respect to the spool and the spool being spaced from the second structure when the spool is in the normal range of movement.

3. The combination recited in claim 2, the second structure of the means for rotating the spool comprising:
   a member rotatably mounted in the housing in juxtaposition with the spool and having a face confronting the spool and provided with serrations;
   means restraining the member from sliding in a direction away from the spool and allowing rotation of the member relative to the housing;
   at least one thermally deformable element connected between the member and the housing; and the first structure comprising:
   an end of the spool confronting the member and having a face provided with serrations engageable with the serrations of the member.

4. The combination set forth in claim 3, the at least one thermally deformable element comprising at least one bi-metallic strip.

5. The combination of claim 2, the second structure of the means for rotating the spool comprising:
   a body rigidly mounted in the housing and having ratchet teeth extending therefrom toward the spool and disposed in an annular array;
   a member slideably mounted in the housing between the body and spool and having ratchet teeth extending therefrom toward and substantially matching the teeth of the body; the means for rotating the spool further comprising:
   means connecting the member and spool when the spool is moved outside said normal range of movement toward said non-operative position, movement of the spool to its inoperative position causing the connecting means to move the member into a position in which its teeth are substantially fully engaged with the teeth of the body.

6. The combination set forth in claim 5, said means connecting the member and spool comprising a solid shank.

7. The combination set forth in claim 5, said means connecting the member and spool comprising:
   a first set of teeth on the spool and confronting the member; and
   a second set of teeth on the member which confront and are engageable with the first set of teeth,
   the spool and member constituting slideable bodies and at least one of said slideable bodies being provided with a shank bearing one set of the first and second sets of teeth,
   said combination further comprising means restraining the member from sliding into a position of engagement of the first and second sets of teeth when the spool is in the normal range of movement thereof.

8. The combination of claim 5, said combination further comprising:
   teeth formed on the member and extending therefrom toward the spool in an annular array;
   an annular body rigidly mounted in the housing between the members and the spool and having teeth matching and confronting the teeth of the member;
   biasing means resiliently biasing the member toward a position in which the teeth extending therefrom toward the spool are engaged with the teeth of the annular body; and
   said connecting means comprising:
   a first set of teeth on the spool and confronting the member; and
   a second set of teeth on the member and engageable with the first set of teeth;
   the spool and member constituting slideable bodies and at least one of said slideable bodies being provided with a shank having extension within the annular body and bearing one set of the first and second sets of teeth;
   said annular body restraining the member from sliding into a position of contact between the first and second sets of teeth when the spool is in the normal range of movement thereof;
   the means for moving the spool from the normal range of movement to the non-operative position being of greater strength than the biasing means and operative for overpowering the biasing means and moving the spool to its inoperative position upon cessation of application of said force to the spool.

9. The combination of claim 8, the respective ratchet teeth of the body and of the annular body being oppositely sloped, the member ratchet teeth extending toward the body being positioned relative to the member teeth extending toward the spool so that, when the member teeth extending toward the annular body and the annular body teeth are fully engaged, the ratchet teeth extending from the member toward the body are staggered from the body ratchet teeth.

10. The combination of claim 9, the matching ratchet teeth of the member and of the body being of different pitch from the matching ratchet teeth of the body and of the annular body; and
    the first and second engageable sets of teeth on the spool and member, respectively, being of smaller pitch than the matching ratchet teeth of the member and of the body and the matching ratchet teeth of the body and of the annular body.

11. The combination of claim 1, the means for supplying a force to the spool being operative for moving the spool from the non-operative position into the normal range of movement and the means for rotating the spool being operative for rotating the same in a given direction, said combination further comprising means for rotating the spool in the given direction while the spool is being moved from the non-operative position into the normal range of movement.

12. The combination recited in claim 1, the means for rotating the spool being responsive to changes in its temperature and operative for rotating the spool in accordance therewith while the spool is in the non-operative position.

References Cited
UNITED STATES PATENTS

| | | | |
|---|---|---|---|
| 2,678,845 | 5/1954 | Fitter | 239—66 XR |
| 2,793,908 | 5/1957 | Carver | 239—66 |
| 3,159,173 | 12/1964 | Fremon | 137—331 |
| 3,181,550 | 5/1965 | Okabe | 137—119 |

WILLIAM F. O'DEA, Primary Examiner

R. GERARD, Assistant Examiner